United States Patent
Takashima et al.

(10) Patent No.: US 10,155,268 B2
(45) Date of Patent: Dec. 18, 2018

(54) CUTTING EDGE CONFIGURATION OF CUTTING TOOL

(75) Inventors: Kazuhiko Takashima, Yokohama (JP); Tomoyoshi Sakamoto, Abiko (JP); Hiroshi Shimomura, Tsukuba (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1206 days.

(21) Appl. No.: 11/908,164

(22) PCT Filed: Mar. 11, 2005

(86) PCT No.: PCT/JP2005/004336
§ 371 (c)(1),
(2), (4) Date: May 22, 2009

(87) PCT Pub. No.: WO2006/097981
PCT Pub. Date: Sep. 21, 2006

(65) Prior Publication Data
US 2009/0297283 A1 Dec. 3, 2009

(51) Int. Cl.
*B23B 41/12* (2006.01)
*B23B 27/00* (2006.01)
*B23B 27/06* (2006.01)
*F16J 10/04* (2006.01)

(52) U.S. Cl.
CPC ............ *B23B 41/12* (2013.01); *B23B 27/005* (2013.01); *B23B 27/06* (2013.01); *F16J 10/04* (2013.01); *B23B 2200/369* (2013.01); *B23B 2215/24* (2013.01); *B23B 2215/242* (2013.01); *B23B 2270/20* (2013.01); *B23B 2270/30* (2013.01); *Y10T 407/235* (2015.01)

(58) Field of Classification Search
CPC .......... B23B 2215/424; B23B 2215/24; B23B 2270/30; B23B 41/12; B23B 27/06; B23B 27/065; B23B 2260/124; B23B 2200/121; B23B 2710/65
USPC ............................ 407/113, 114; 82/158, 161
See application file for complete search history.

(56) References Cited

U.S. PATENT DOCUMENTS 3,436,799 A * 4/1969 Kopy ............................... 407/77
3,871,251 A * 3/1975 Mundy ........................... 76/115
3,882,580 A * 5/1975 Lundgren ..................... 407/116
(Continued)

FOREIGN PATENT DOCUMENTS

DE 3133941 A1 * 3/1983 ............. B23B 27/16
GB 1117199 A 6/1968
(Continued)

*Primary Examiner* — Jennifer Swinney
(74) *Attorney, Agent, or Firm* — Foley & Lardner LLP

(57) ABSTRACT

A cutting edge configuration of a cutting tool for performing a cutting process on a surface (21) of a workpiece (19), the cutting tool including a rake face (3) provided with first and second cutting edges (11, 13), the cutting tool being moved relative to the surface-to-be-cut (21) with the first and second cutting edges (11, 13) cutting thereinto to thereby perform the cutting process, wherein the first cutting edge (11) is positioned ahead of the second cutting edge (13) in a cutting direction (z-direction) of the cutting tool to provide the rake face (3) with a feed-direction (y-direction) rake-angle, and the cutting tool is fed in a direction from a side of the second cutting edge (13) to a side of the first cutting edge (11).

6 Claims, 15 Drawing Sheets

(56) References Cited

U.S. PATENT DOCUMENTS

| | | | | |
|---|---|---|---|---|
| 3,934,319 A * | 1/1976 | Schuler | B23C 5/207 |
| | | | 407/113 |
| 4,065,223 A * | 12/1977 | Nelson | 407/114 |
| 4,632,608 A * | 12/1986 | Blomberg | B23B 27/145 |
| | | | 407/114 |
| 4,669,925 A * | 6/1987 | Lowe et al. | 407/114 |
| 4,848,205 A * | 7/1989 | Suzuki et al. | 83/853 |
| 4,990,036 A * | 2/1991 | Eklund et al. | 407/113 |
| 5,141,367 A * | 8/1992 | Beeghly | B23B 27/143 |
| | | | 407/114 |
| 5,218,893 A * | 6/1993 | Shikata | 82/1.11 |
| 5,579,674 A * | 12/1996 | Wildey | 83/835 |
| 5,593,255 A * | 1/1997 | Satran et al. | 407/113 |
| 5,632,941 A | 5/1997 | Mehrotra et al. | |
| 5,775,187 A * | 7/1998 | Nikolai | B21C 37/207 |
| | | | 407/113 |
| 5,807,031 A * | 9/1998 | Arai et al. | 407/113 |
| 6,196,770 B1 * | 3/2001 | Astrom et al. | 407/40 |
| 6,244,934 B1 | 6/2001 | Miyai et al. | |
| 6,595,092 B1 * | 7/2003 | Taniguchi | B23B 27/06 |
| | | | 407/114 |
| 6,612,786 B1 * | 9/2003 | Kanada et al. | 407/118 |
| 6,622,685 B2 * | 9/2003 | Takahashi et al. | 123/193.2 |
| 6,669,412 B1 * | 12/2003 | Hirose | B23C 5/2221 |
| | | | 407/113 |
| 6,761,510 B2 * | 7/2004 | Kinukawa et al. | 407/113 |
| 6,931,975 B2 * | 8/2005 | Haughton et al. | 83/853 |
| 7,014,395 B2 * | 3/2006 | Daiguji et al. | 407/113 |
| 7,216,571 B2 * | 5/2007 | Schreiber et al. | 82/1.11 |
| 7,607,209 B2 * | 10/2009 | Iizumi et al. | 29/458 |
| 7,640,833 B2 * | 1/2010 | Kimura | 82/1.11 |
| 2002/0127068 A1 | 9/2002 | Kinukawa et al. | |
| 2003/0170079 A1 | 9/2003 | Daiguji et al. | |
| 2004/0065183 A1 * | 4/2004 | Asada | 83/838 |
| 2006/0230889 A1 * | 10/2006 | Kimura | B23B 1/00 |
| | | | 82/1.11 |

FOREIGN PATENT DOCUMENTS

| | | | | |
|---|---|---|---|---|
| JP | 1-306104 A | | 12/1989 | |
| JP | 01321101 A | * | 12/1989 | B23B 27/14 |
| JP | 6-182604 A | | 7/1994 | |
| JP | 11-320414 A | | 11/1999 | |
| JP | 2002-192407 A | | 7/2002 | |
| JP | 2003-175408 A | | 6/2003 | |
| JP | 2003-334716 A | | 11/2003 | |
| JP | 2005-88091 A | | 4/2005 | |
| WO | WO 02/40850 A1 | | 5/2002 | |

* cited by examiner

CUTTING EDGE CONFIGURATION OF CUTTING TOOL

TECHNICAL FIELD

The present invention relates to a cutting edge configuration of a cutting tool used in the process for roughening a surface of a workpiece.

BACKGROUND ART

Blasting process and cutting process are methods commonly employed for roughening the inner circumferential surface of a cylinder or the like of an internal combustion engine. Japanese Patent Application Laid-open Publication No. H11-320414 discloses a method of blasting the inner circumferential surface of a cylinder.

Suppose a case of forming a rough surface on a cylindrical inner wall, such as a cylinder circumferential surface of a cylinder. In a state that the nose portion at the tip end of the cutting edge portion of a cutting tool is pressed on the cylindrical inner wall, the workpiece is rotated about the axis of the inner circumferential wall, and concurrently, the cutting tool is fed in the direction of the above-mentioned axis. In this cutting process, a rough surface is formed on the inner circumferential wall of the workpiece by the fluctuating depth of cut due to fluctuating chip flow and fluctuating cutting force in the thrust direction.

DISCLOSURE OF THE INVENTION

The conventional method of forming a rough surface by the cutting process, however, only produces an insufficiently rough finished surface. This is because the cutting tool lacks the controlling of chip-flow and the shape of the cutting edge of the tool is not suitable for obtaining a sufficient cutting force in the thrust direction. In addition, incompletely broken pieces, i.e. what is called burrs, are produced, which results in insufficient roughness of the finished surface.

An object of the present invention is to provide a cutting edge configuration of a cutting tool capable of producing an adequately-rough finished surface without producing incompletely broken pieces.

To accomplish the above-mentioned object, the cutting edge configuration of a cutting tool according to the present invention is a cutting edge configuration of a cutting tool for performing a cutting process on a surface of a workpiece, the cutting tool including a rake face provided with first and second cutting edges, the cutting tool being moved relative to the surface-to-be-cut with the first and second cutting edges cutting thereinto to thereby perform the cutting process, wherein the first cutting edge is positioned ahead of the second cutting edge in a cutting direction of the cutting tool to provide the rake face with a feed-direction rake-angle, and the cutting tool is fed in a direction from a side of the second cutting edge to a side of the first cutting edge.

According to the above-described cutting edge configuration of a cutting tool, the rake angle in the feed direction formed by the rake face of the cutting tool realizes a chip-flow control such that the chip can successively interfere with a portion subjected to the cutting process on the finished surface side. Use of this interference for successively breaking the top portions of the acute-angle ridges of the portion subjected to the cutting process enables the formation of an adequately-rough surface. As a consequence, a sufficient bonding strength can be obtained when, in a later process, to the base material, such as aluminum and iron, with the adequately-rough surface, a material of a different kind from that of the base material is made to be joined by spraying or by casting.

BEST MODE FOR CARRYING OUT THE INVENTION

Hereinbelow, a detailed description of the present invention will be given with reference to the drawings. In each drawing, hypothetical axes are shown for the purpose of clearly illustrating the direction of cutting edges, and the inclined angles of rake faces and of flank faces. The positive z-direction is the cutting direction, that is, the direction in which the cutting tool is moved relative to, while performing cutting on, the surface-to-be-cut. The positive y-direction is the feed direction, that is, the direction in which the cutting tool is moved relative to the surface-to-be-cut for the purpose of allowing the cutting tool to continue the cutting (the direction of the feeding movement). The negative x-direction is the cutting-in direction, that is, the direction in which the cutting tool is forced to cut in the surface-to-be-cut. Note that, in the description that follows, the positive z-direction may be sometimes referred to as the front-side in the cutting direction; the negative z-direction, the rear-side in the cutting direction; the positive y-direction, the front-side in the feed direction; and the negative y-side, the rear-side in the feed direction.

Figure 1:
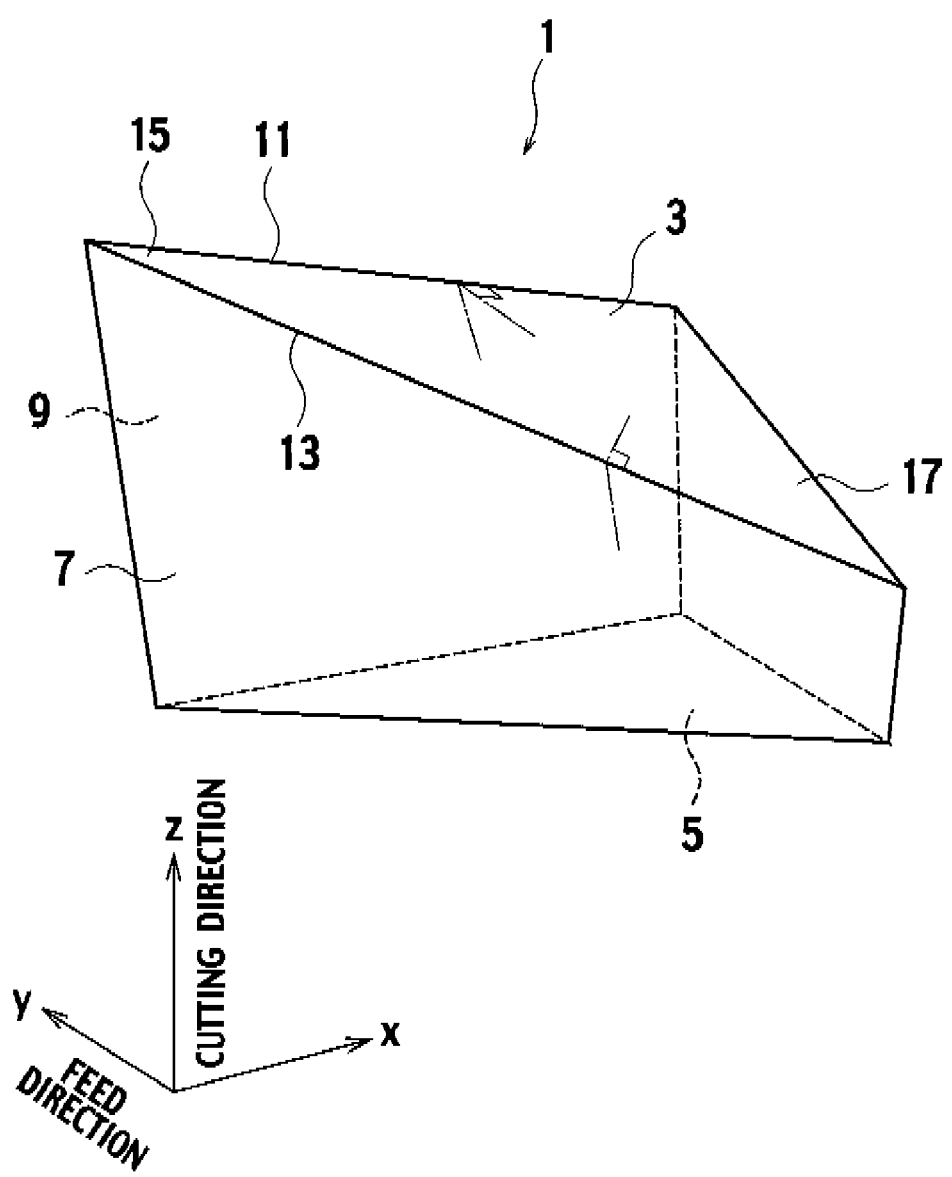
FIG. 1 is a perspective view illustrating a tip end portion of a cutting tool according to an embodiment of the present invention.

The tip end portion of a cutting tool 1 according to the present inventions as shown in FIG. 1, is in a substantially triangular prism shape. The tip-end portion includes a rake face 3 on the front-side in the cutting direction, and a bottom face 5, which is located at the rear-side in the cutting direction of the rake face 3. The bottom face 5 is opposed to the rake face 3 with a distance in between. The tip-end portion also includes a side face 7 on the front-side in the feed direction, and another side face 9 on the rear-side in the feed direction. The rake face 3, and the side faces 7 and 9 are flat surfaces. A first cutting edge 11 is formed as the intersecting line between the rake face 3 and the side face 7, which intersecting line is located at the front-side edge in the feed direction of the rake face 3. A second cutting edge 13 is formed as the intersecting line between the rake face 3 and the side face 9, which intersecting line is located at the rear-side edge in the feed direction of the rake face 3. A nose portion 15 is formed at the tip-end portion, in the cutting direction, of the rake face 3 by the intersecting rake face 3 and side faces 7 and 9. The end portion opposite from the nose portion is a base-end portion 17. The nose portion 15 is positioned ahead of the base-end portion 17 in the cutting direction, and, at the same time, the first cutting edge 11 is positioned ahead of the second cutting edge 13 in the cutting direction. In other words, the rake face 3 is inclined so that the portion thereof closer to the tip end in the cutting-in direction (in the negative x-direction) is positioned forward in the cutting direction (positive z-direction) and that the portion thereof closer to the front-side in the feed direction (positive y-direction) is positioned forward in the cutting direction (positive z-direction). In short, the rake face 3 is provided with a rake angle in the feed direction.

Figure 2:
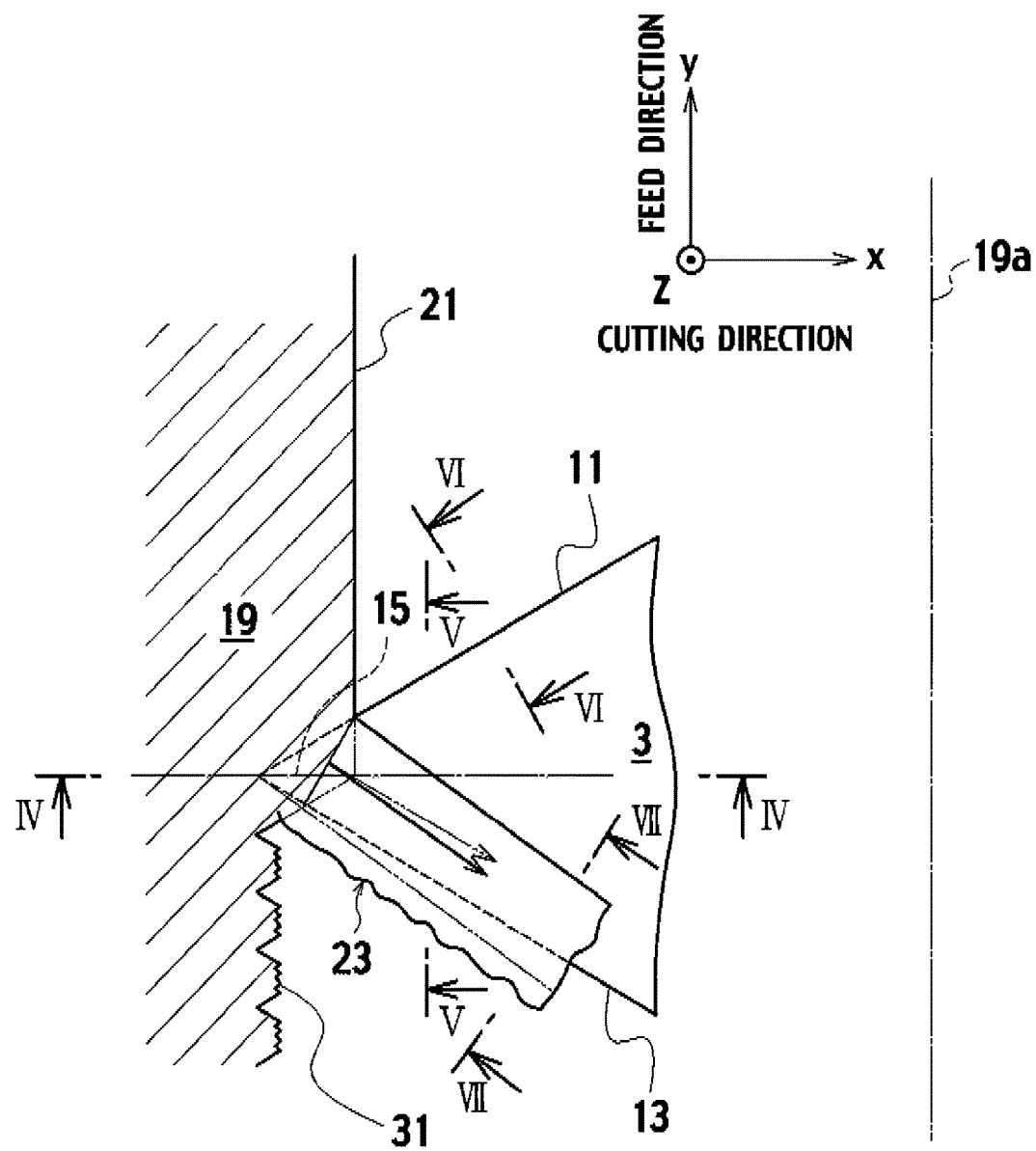
FIG. 2 is a vertical cross-sectional view illustrating a state where a cutting process is carried out on the inner circumferential wall of a workpiece by use of a cutting tool according to the embodiment of the present invention.

FIG. 2 is a cross-sectional view in the plane including a center axis 19a of a cylindrical inner circumferential wall 21 of a workpiece 19, illustrating a state where a cutting process is performed on the cylindrical inner circumferential wall 21 upwards from the bottom of the drawing. In this embodiment, the workpiece 19 is rotated about the axis 19a relative to the cutting tool 1 while the cutting tool 1 is relatively moved linearly in parallel with the axis 19a and is fed upward in the drawing. Note that a similar aspect of the cutting process to the case shown in FIG. 2 is accomplished in a case where the cutting tool 1 is fed upward while being rotated about the axis 19a relative to the work piece 19 that is not moved.

As shown in FIG. 2, the cutting process is performed as follows. The cutting tool 1 is attached to an unillustrated machine tool main body, and then the tip-end nose portion 15 of the cutting tool 1 is pressed onto the surface-to-be-cut, i.e., the cylindrical inner circumferential wall 21 of the workpiece 19. While the nose portion 15, thus pressed, is cut into the inner circumferential wall 21, the workpiece 19 is rotated about the axis 19a. By this rotation of the workpiece 19, the nose portion 15 of the cutting tool 1 that is cut into the inner circumferential wall 21 of the workpiece 19 is moved, relative to the inner circumferential wall 21, in the cutting direction (in FIG. 2 from the back-side of the sheet to the front-side thereof). Concurrently with the rotational movement of the workpiece 19, the cutting tool 1 is fed and moved. The direction of feeding is substantially aligned with the axis 19a of the workpiece 19. With the combination of the rotational movement of the workpiece 19 and the feeding movement of the cutting tool 1, the cutting tool 1 is moved, relative to the inner circumferential wall 21, in the circumferential direction and, simultaneously, in the axial direction. Accordingly, the nose portion 15 of the cutting tool 1 continues the cutting movement as leaving a spiral trace on the inner circumferential wall 21.

Figure 3:
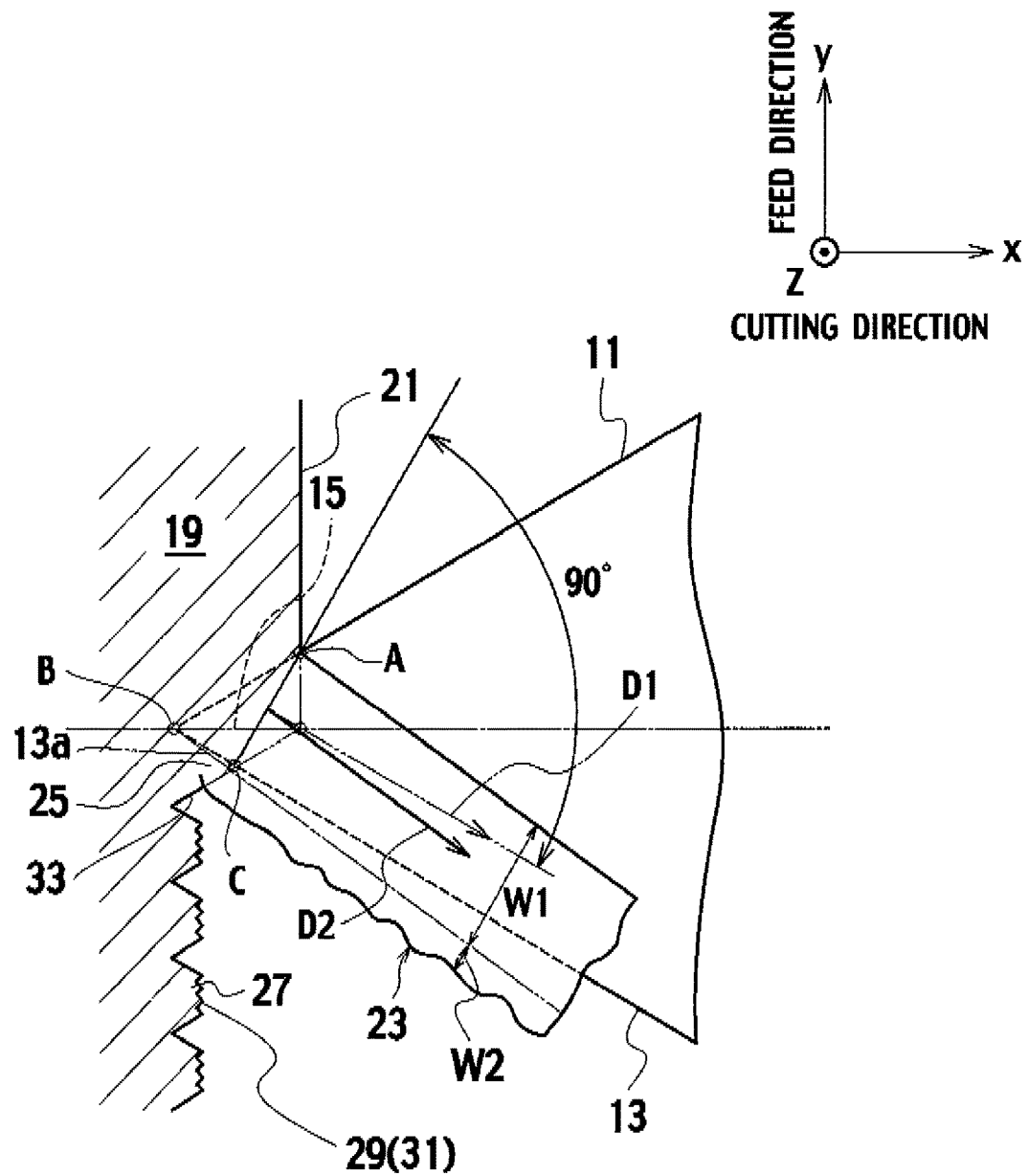
FIG. 3 is an enlarged cross-sectional view of a main portion of FIG. 2.
Figure 5:
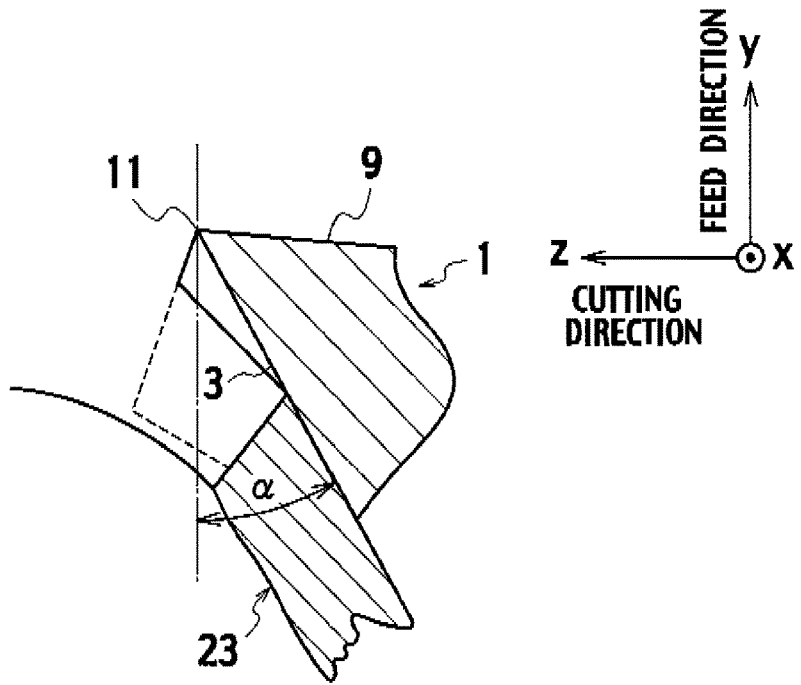
FIG. 5 is a cross-sectional view taken along the line V-V of FIG. 2.

In this embodiment, chip 23 (with a width equal to W1+W2) produced by the cutting process is formed, as shown in FIG. 3, of a portion generated by the cutting performed by the tip-end portion of the first cutting edge 11 (the portion, which has a width W1, between the tip end B of the nose portion 15, and an intersecting point of the first cutting edge 11 and a surface 21 to be cut) and a portion produced by breakage (with a width W2). An arrow D1 shown in FIG. 3 indicates the direction in which the chip is discharged in a case where no feed-direction rake-angle is set for the rake face 3 (i.e. no inclined angle to the feed direction of the cutting tool 1 is set to the rake face 3). Now, the surface formed by the cutting work performed, on the inner circumferential wall 21 of the workpiece 19, by the tip-end portion of the first cutting edge 11 is defined as a cut surface 33. The above-mentioned direction D1 is orthogonal to the line connecting the point A mentioned above and an intersecting point C between the cut surface 33 and the imaginary surface 13a formed by the moving second cutting edge 13. In this embodiment, as shown in FIG. 5, a feed-direction rake-angle $\alpha$ is given to the rake face 3, so that the direction in which the chip is discharged is shifted to the rear-side in the feed direction from the direction of the case where no such feed-direction rake-angle is given. As a consequence, a portion 25 of the chip 23 in the rear side in the feed direction interferes with a ridge portion (top portion) of a thread 27, which portion is formed by the imaginary surface 13a of the second cutting edge 13 and the cut surface 33 formed by the first cutting edge 11. As a result of this interference, the ridge portion of the thread 27 is ripped away so that a rough surface 31 is formed as a broken surface 29 of the thread 27.

Figure 4:
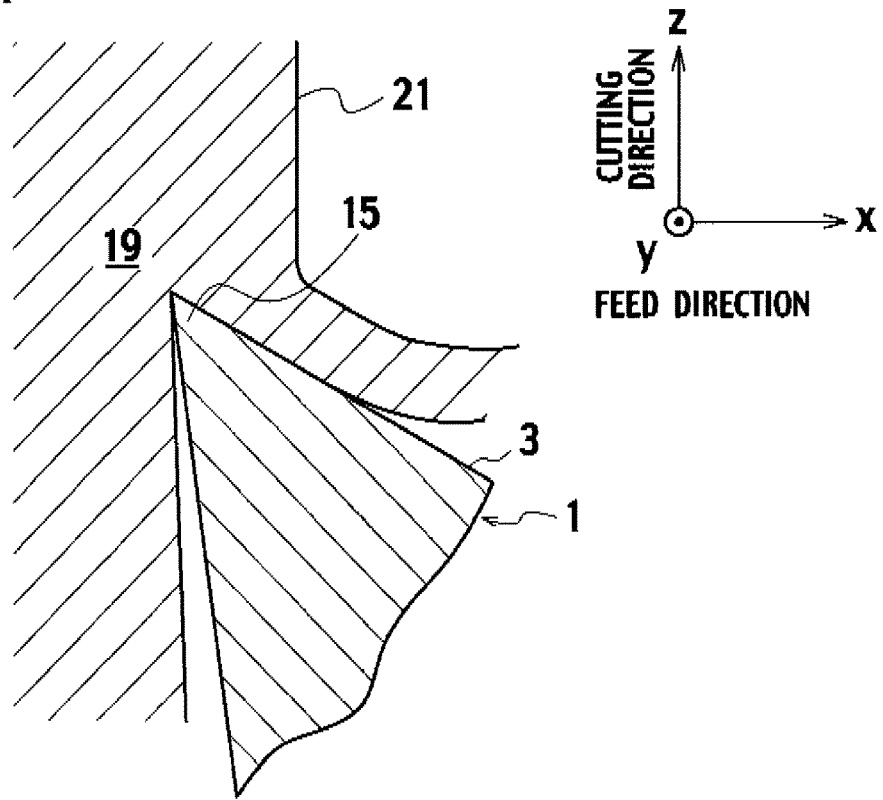
FIG. 4 is a cross-sectional view taken along the line IV-IV of FIG. 2.
Figure 6:
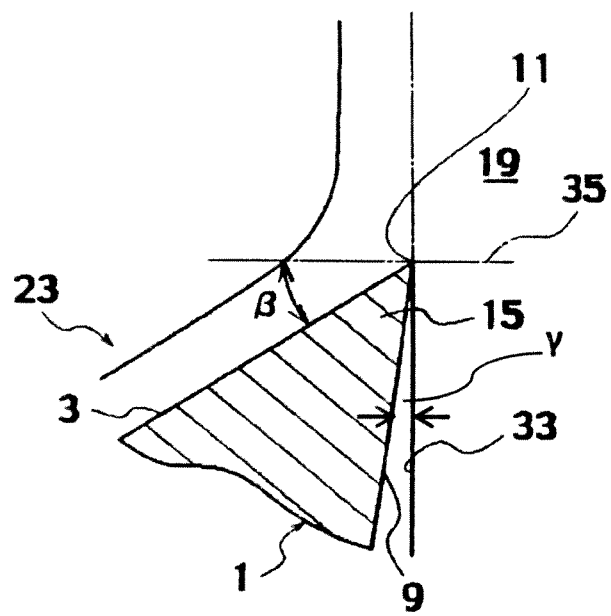
FIG. 6 is a cross-sectional view taken along the line VI-VI of FIG. 2.

As shown in FIG. 4, the inner circumferential wall 21 of the workpiece 19 is processed by cutting so that the chip 23 is produced towards the front-side of the sheet on which FIG. 2 is shown. In addition, the orthogonal rake angle $\beta$ of the first cutting edge 11 side (an angle formed by the rake face 3 to a normal line 35 to the cut surface 33 within a plane orthogonal to the first cutting edge 11) is set to be positive, as shown in FIG. 6. To put it other way, the rake face 3 in the vicinity of the first cutting edge 11 is inclined, with respect to the direction of the axis 19a of the workpiece 19, towards the opposite side to the cutting direction. A clearance angle $\gamma$ is formed between the side face 9 and a cut surface formed by the first cutting edge 11.

Figure 7:
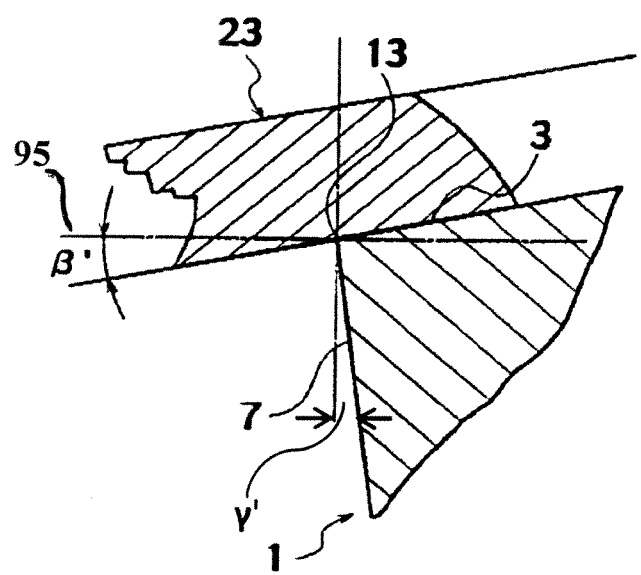
FIG. 7 is a cross-sectional view taken along the line VII-VII of FIG. 2.

Moreover, the orthogonal rake angle $\beta'$ of the second cutting edge 13 side is set to be negative, as shown in FIG. 7. To put it other way, the rake face 3 in the vicinity of the second cutting edge 13 is inclined, with respect to the direction of the axis 19a of the workpiece 19, to the cutting direction by an angle β'. Note that FIG. 6 corresponds to a portion, indicated by the dash-dotted line, of the first cutting edge 11 in FIG. 1. FIG. 7 corresponds to a portion, indicated by the dash-dotted line, of the second cutting edge 13 in FIG. 1. A clearance angle γ' is formed between the side face 7 and a path defined by a path of the second cutting edge 13. The orthogonal rake angle β' of the second cutting edge 13 is formed by the rake face 3 to a second line 95 which is within a plane orthogonal to the second cutting edge 13 and is perpendicular to the cutting direction.

Next, for the purpose of comparison with the cutting tool 1 of this embodiment, a brief description will be given of a tool with no feed-direction rake-angle being given to the rake face.

Figure 8:
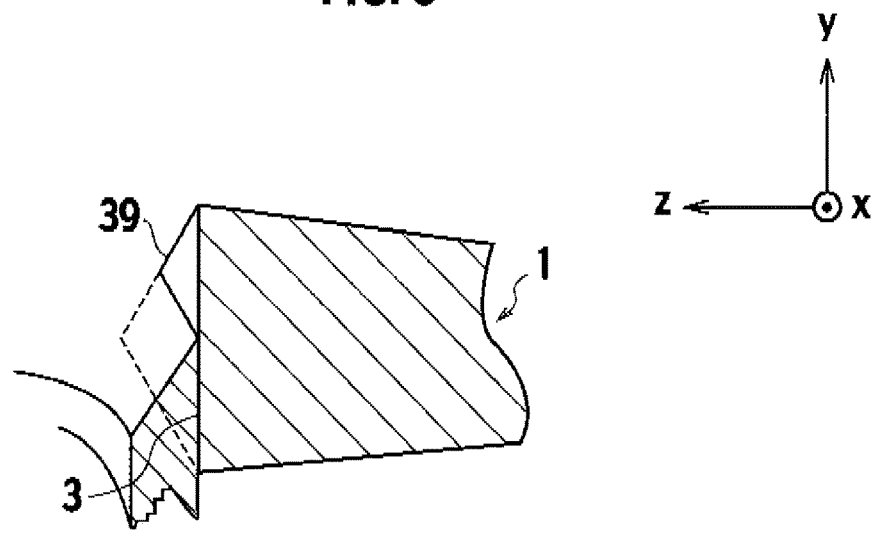
FIG. 8 is a cross-sectional view of a comparative example corresponding to FIG. 5.
Figure 9:
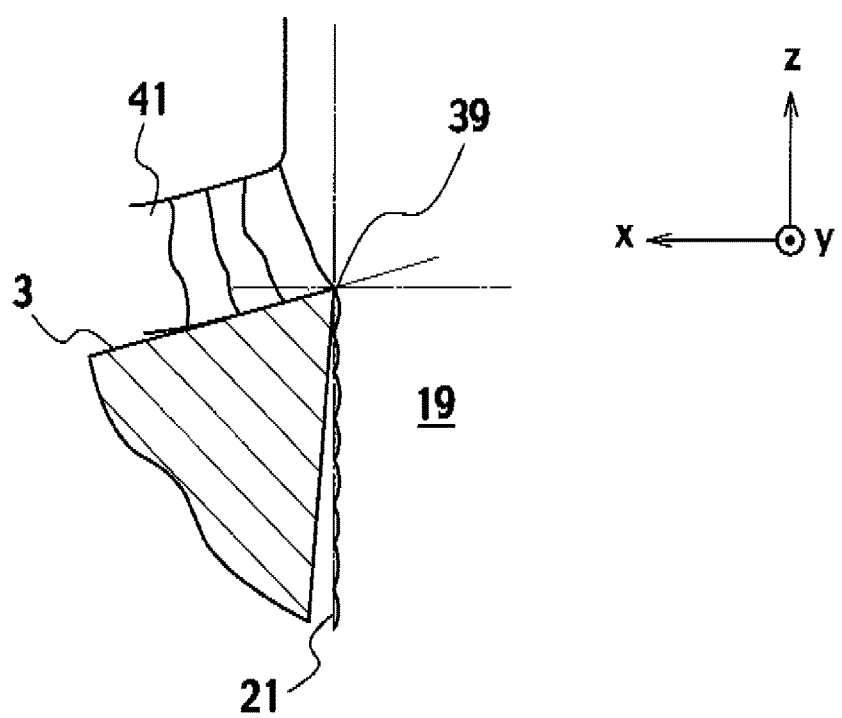
FIG. 9 is a cross-sectional view of the comparative example corresponding to FIG. 4.
Figure 10:
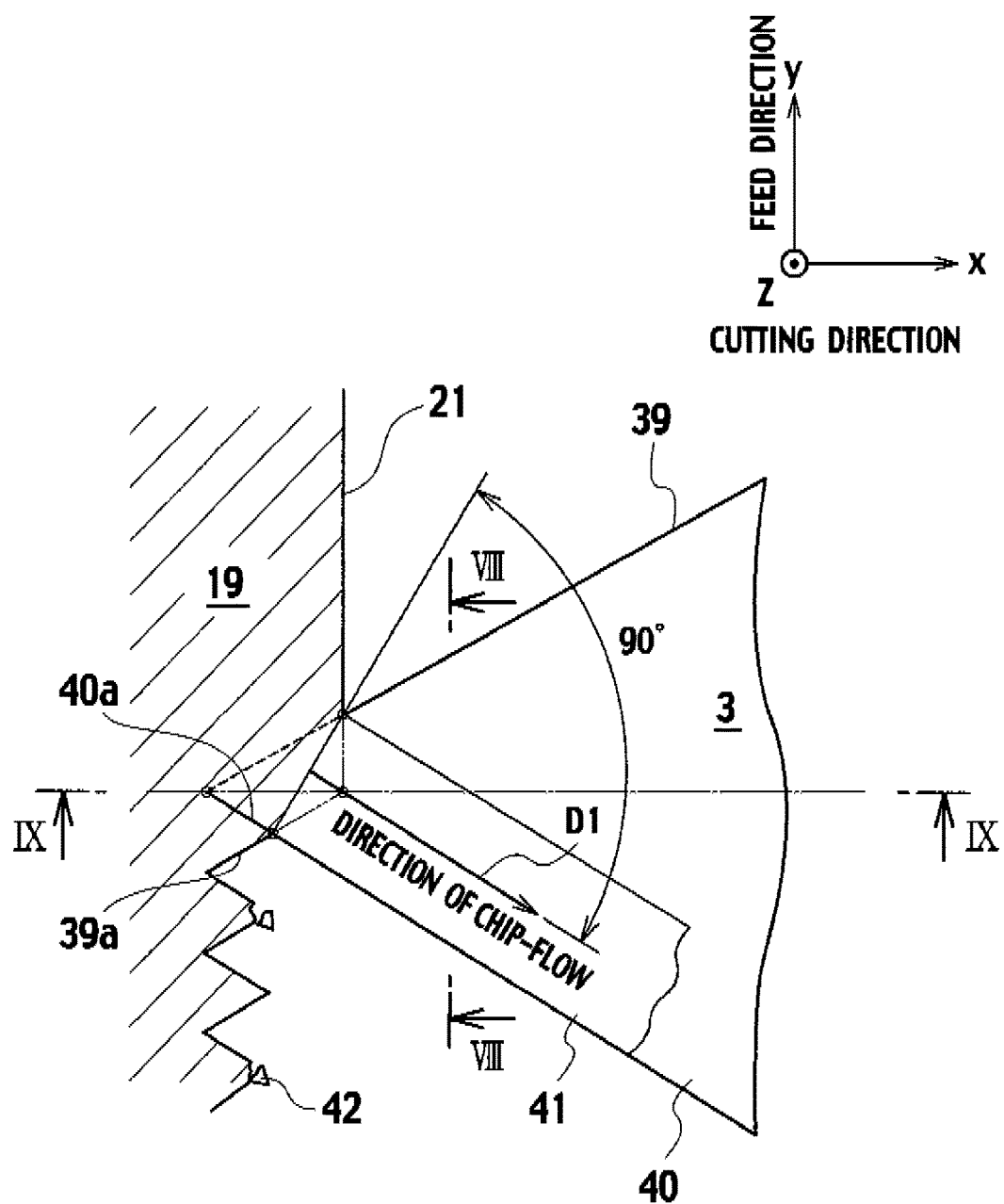
FIG. 10 is a cross-sectional view of the comparative example corresponding to FIG. 3.

In this comparative example, as shown in FIG. 8, a rake face 3 is made parallel to the feed direction of the tool (y-axis). As shown in FIG. 9, a chip 41 formed by cutting work performed by a first cutting edge 39 is likely to be separated. The cut surface of the inner circumferential wall 21 of a workpiece 19 is formed, from a microscopic viewpoint, in a convex and concave shape with a repetition of peaks and valleys. In addition, as shown in FIG. 10, the direction in which the chip 41 is flowing out is a direction indicated as D1. Accordingly, the chip 41 does not interfere with the ridge portion of the thread formed by a cut surface 39a formed by the first cutting edge 39 and a cut surface 40a formed by a second cutting edge 40. As a result, many burrs 42 are produced in the finished surface. In other words, most of the chip 41 is made up of the chip produced by cutting, so that there remains no chip produced by breakage (the portion corresponding to W2 in FIG. 3).

Figure 11:
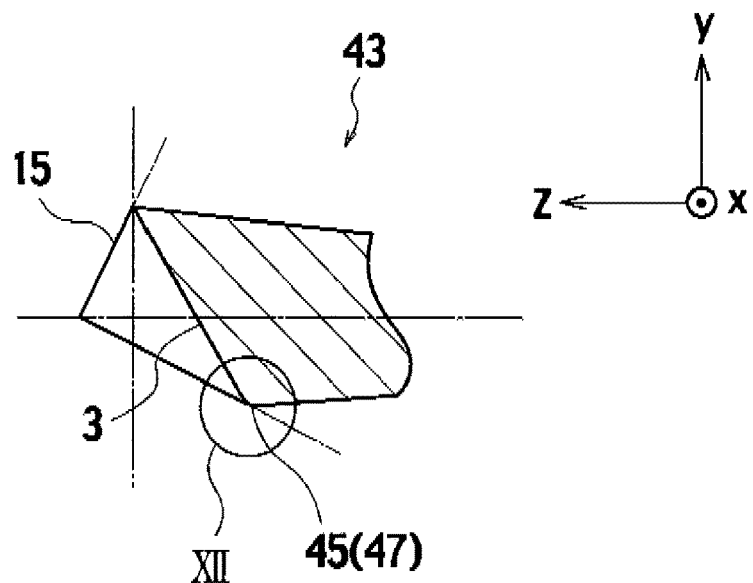
FIG. 11 is a cross-sectional view of a cutting tool in which a second cutting edge is provided with a honing.
Figure 12:
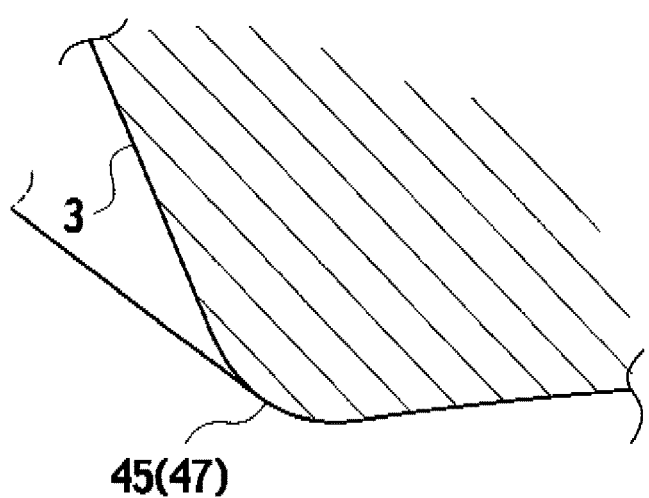
FIG. 12 is an enlarged cross-sectional view of the portion XII of FIG. 11.

FIGS. 11 and 12 are cross-sectional views of the tip-end portion of a cutting tool 43 corresponding to FIG. 5. Provided to the tip-end portion is a honing 47, which is formed by chamfering a second cutting edge 45 into a round shape.

Figure 13:
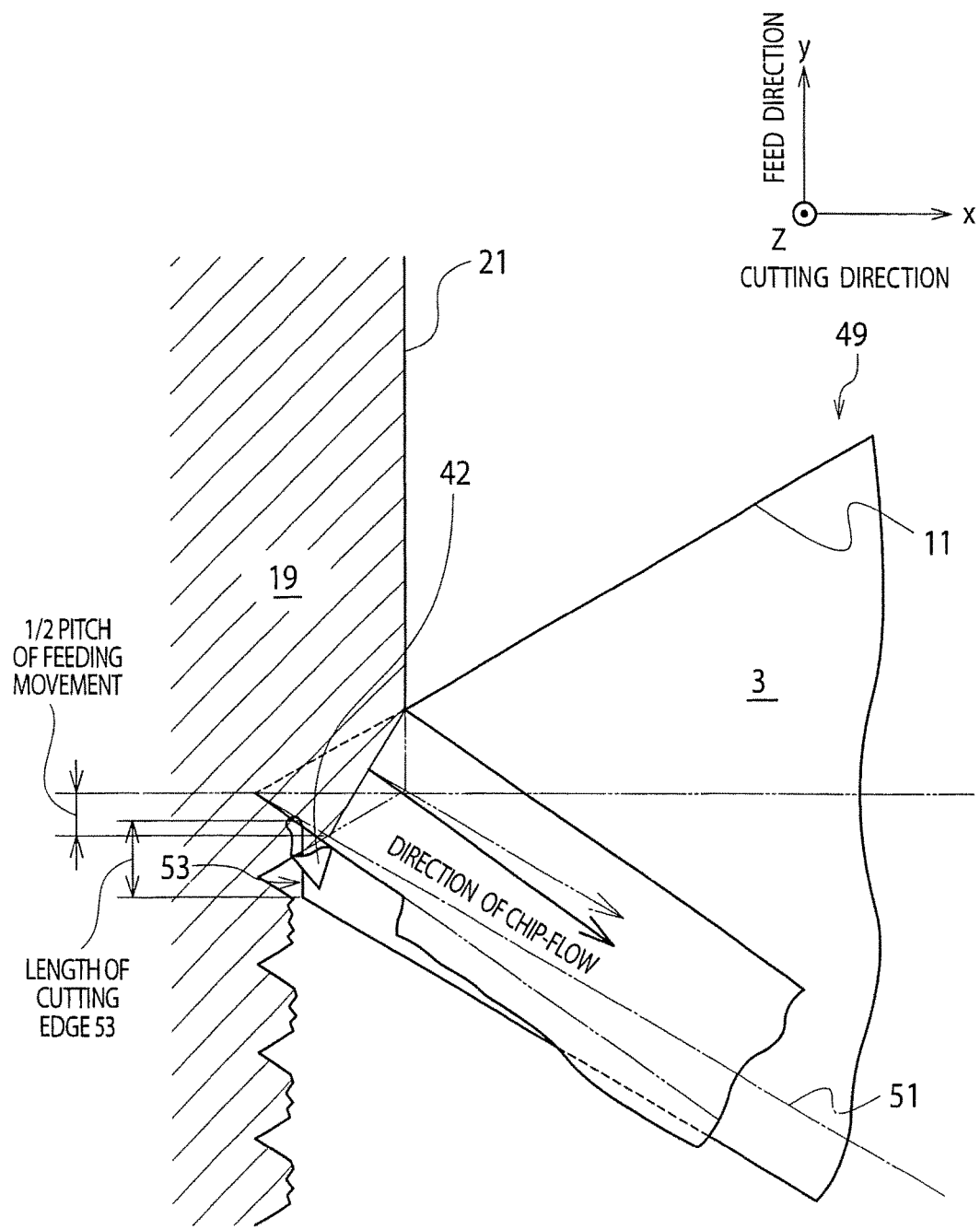
FIG. 13 is a cross-sectional view illustrating a state where a cutting process is performed on the inner circumferential wall of a workpiece with use of a cutting tool provided with an incompletely-broken-pieces removing blade.
Figure 14:
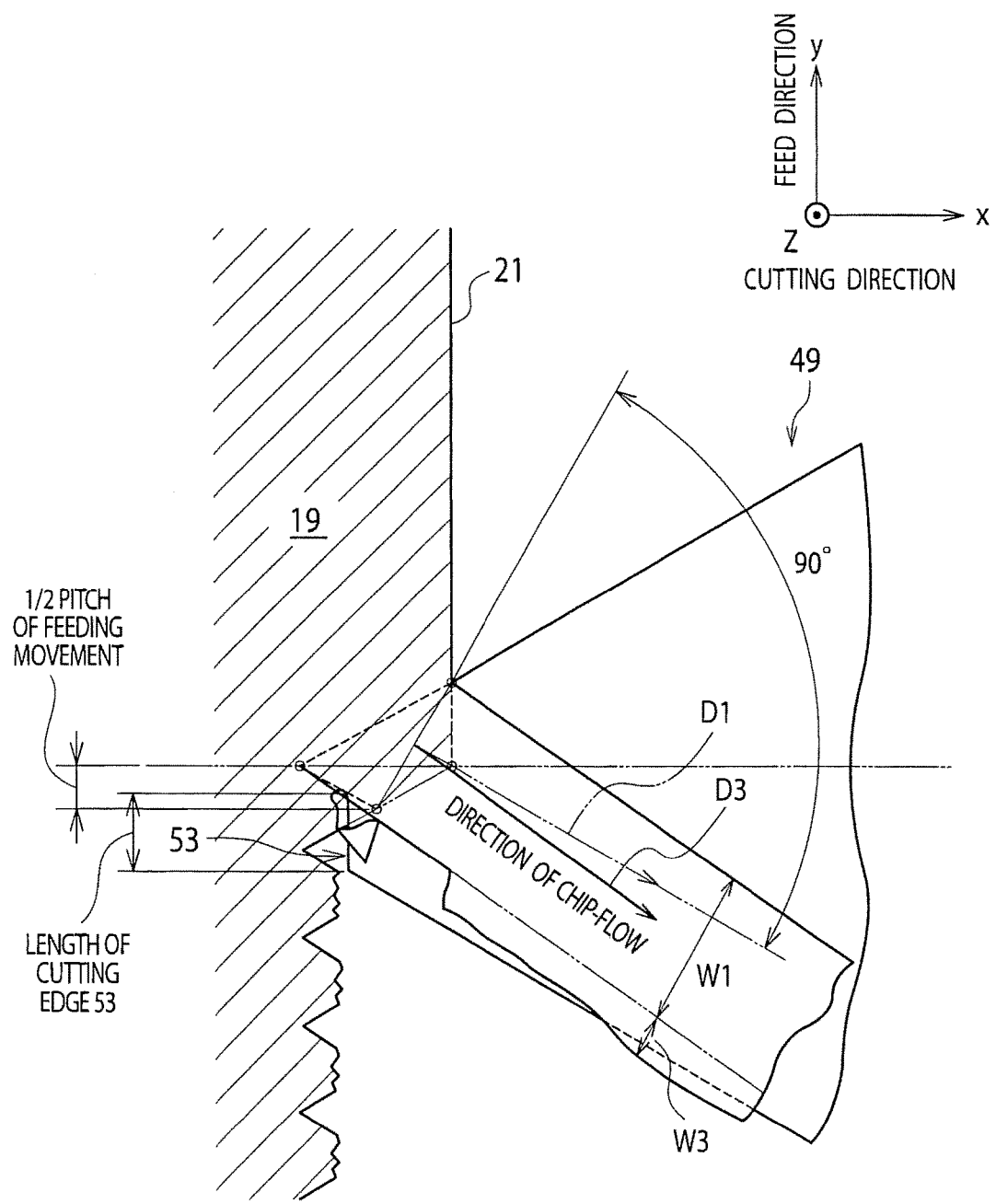
FIG. 14 shows a cross-sectional view illustrating a main portion of FIG. 13.

In addition, FIGS. 13 and 14 show a cutting tool 49, including both the feed-direction rake-angle and a cutting edge for removing incompletely broken pieces. The rake face 3, as is the case of FIG. 5, is inclined to the feed direction by the feed-direction rake-angle α. Accordingly, a chip 54 (with a width=W1+W3) is formed of a chip (with a width W1) produced by cutting and of another chip produced by breaking (with a width W3). The direction (D3) in which the chip 54 is discharged (indicated by a solid line) is shifted from D1 (indicated by a dashed-two dotted line) to the rear-side in the feed direction. A cutting edge 53 for removing incompletely broken pieces is provided at the edge of a second cutting edge 51 of the rake face 3 so as to extend towards the rear-side in the feed direction. The cutting edge 53 for removing incompletely broken pieces is positioned so as to interfere with a ridge portion of a thread formed, at the time of cutting process, on the finished surface of the inner circumferential wall 21.

Figure 15:
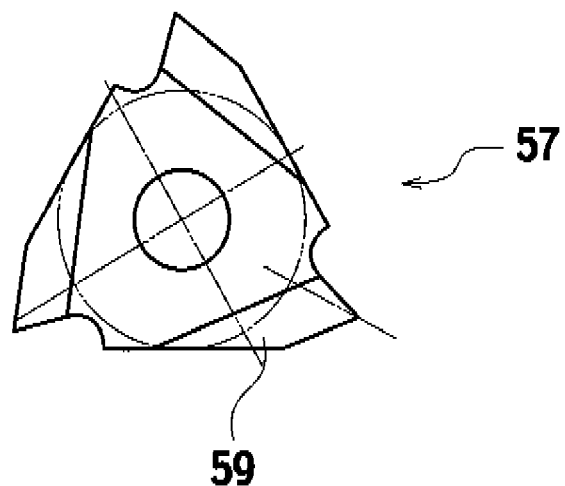
FIG. 15 is a plan view of a chip provided with the incompletely-broken-pieces removing blade.
Figure 16:
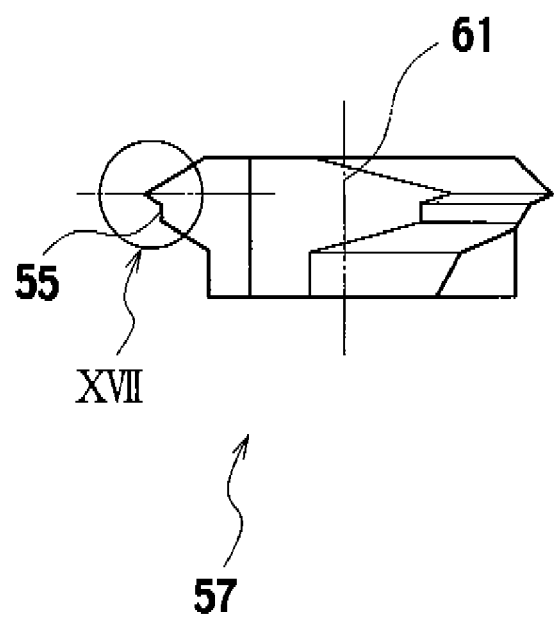
FIG. 16 is a side view of the chip of FIG. 15.
Figure 17:
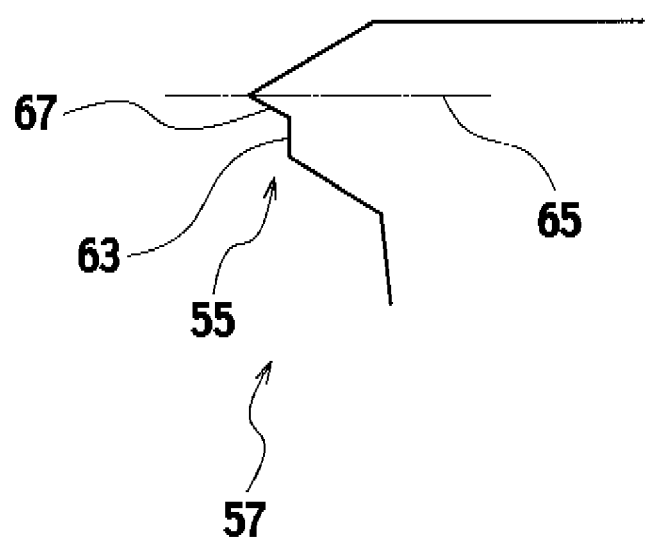
FIG. 17 is an enlarged side view of the portion XVII of the chip of FIG. 16.
Figure 18:
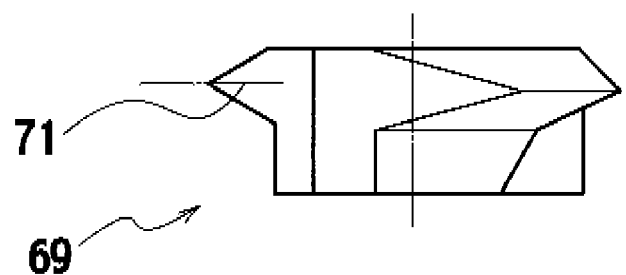
FIG. 18 is a side view, shown for comparative purpose, of a chip provided with no incompletely-broken-pieces removing blade.

FIGS. 15 to 17 show a chip 57 provided with three rake faces 59. Each of the rake faces 59 is provided with a cutting edge 55 for removing incompletely broken pieces. A worn rake face 59 that is currently in use may be replaced by a second rake face 59 that is not yet worn, by turning and reattaching the chip 57. As shown in FIGS. 16 and 17, the cutting edge 55 for removing incompletely broken pieces is formed in a zigzag cross-sectional shape by a vertical face 63, which is in parallel to the attachment axis direction 61 of the chip 57, and by a horizontal face 67, which is formed along the radial direction 65 of the chip 57. The cutting edge 55 for removing incompletely broken pieces, here, is formed integrally with the chip 57 of the main tool, but the cutting edge 55 may be formed as a separate body. As shown, for comparative purposes, in FIG. 18, a nose portion 71 of a chip 69 provided with no cutting edge for removing incompletely broken pieces has a substantially triangular cross-sectional shape when viewed from a side.

Furthermore, FIGS. 19 to 26 illustrate a bite 73, a boring bar 75, and a boring tool 77, in each of which the cutting tool described thus far is attached to the tool main body.

Figure 19:
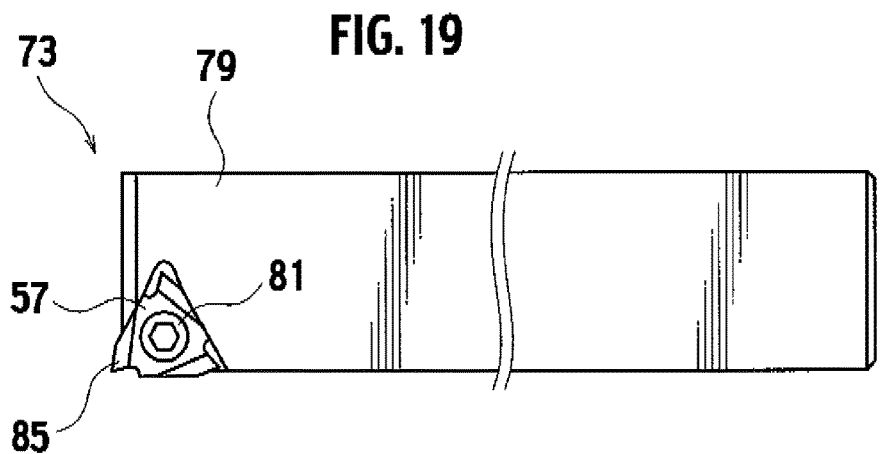
FIG. 19 is a plan view illustrating a cutting tool according to an embodiment of the present invention.
Figure 20:
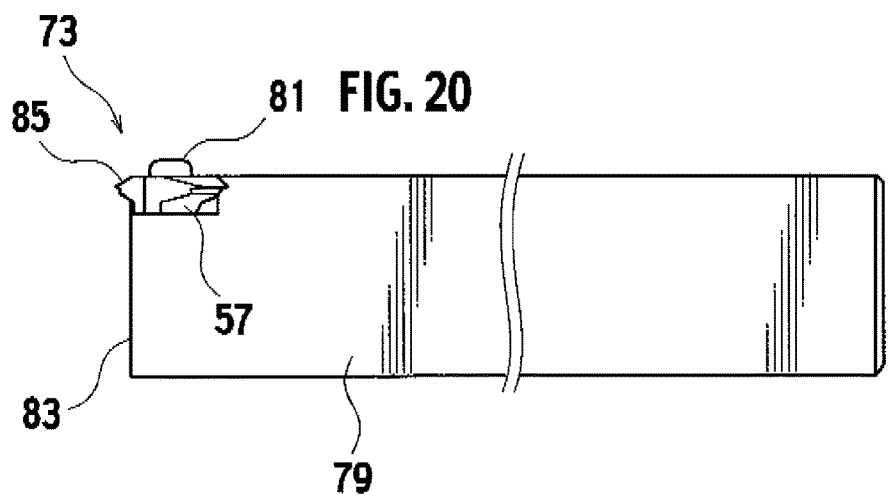
FIG. 20 is a front view of the cutting tool of FIG. 19.
Figure 21:
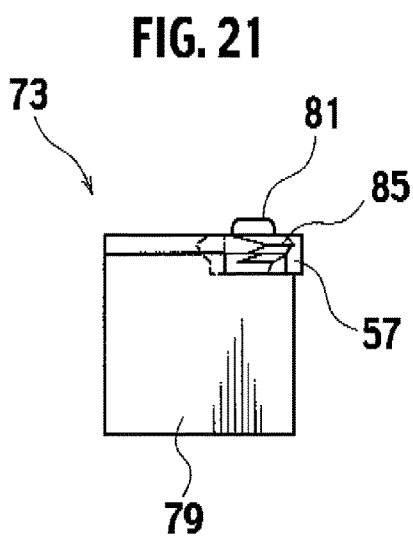
FIG. 21 is a side view of the cutting tool of FIG. 19.

As shown in FIGS. 19 to 21, in the bite 73, the chip 57 is fastened, with a bolt 81, to the tip end of a tool main body 79, which is formed into a substantially prismatic shape. In this case, as shown in FIG. 20, a nose portion 85 of the chip 57 slightly sticks out from a tip-end face 83 of the tool main body 79. The cutting process is performed on the inner circumferential wall 21 of the workpiece 19 by making this nose portion 85 cut into the inner circumferential wall 21.

Figure 22:
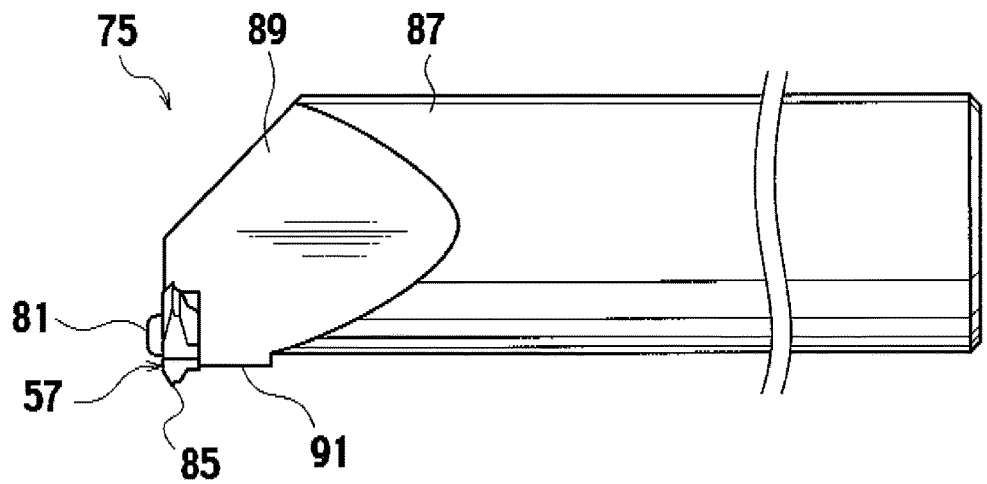
FIG. 22 is a plan view illustrating a boring bar according to an embodiment of the present invention.
Figure 23:
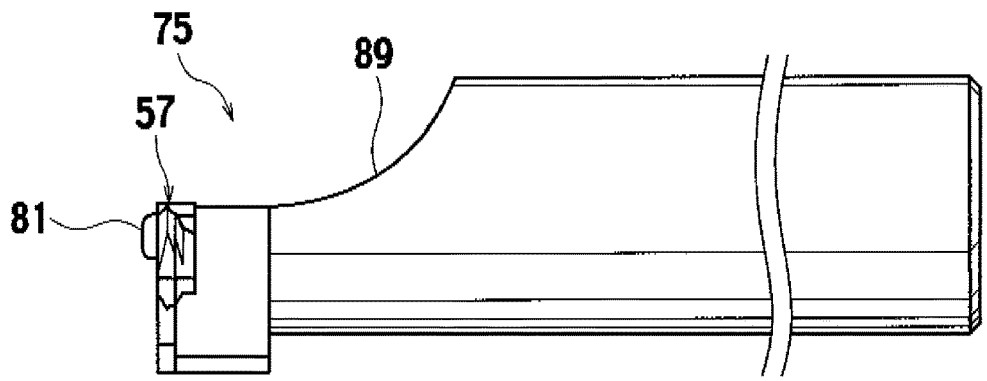
FIG. 23 is a front view of the boring bar of FIG. 22.
Figure 24:
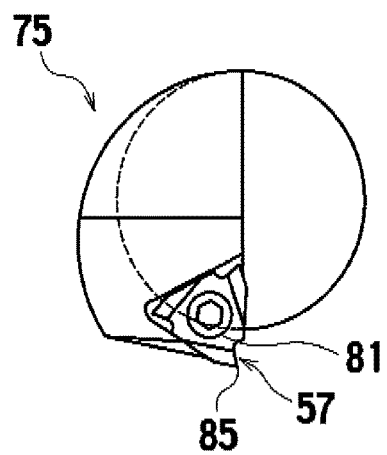
FIG. 24 is a side view of the boring bar of FIG. 22.

In addition, as shown in FIGS. 22 to 24, in a tip-end portion 89 of a tool main body 87 of the boring bar 75, a curved cutaway in the radial direction is formed, and the chip 57 is fastened to the tip-end portion 89 with a bolt 81. In this case also, a nose portion 85 of the chip 57 is arranged so as to slightly protrude outwards from a side face 91 of the tool main body 87.

Figure 25:
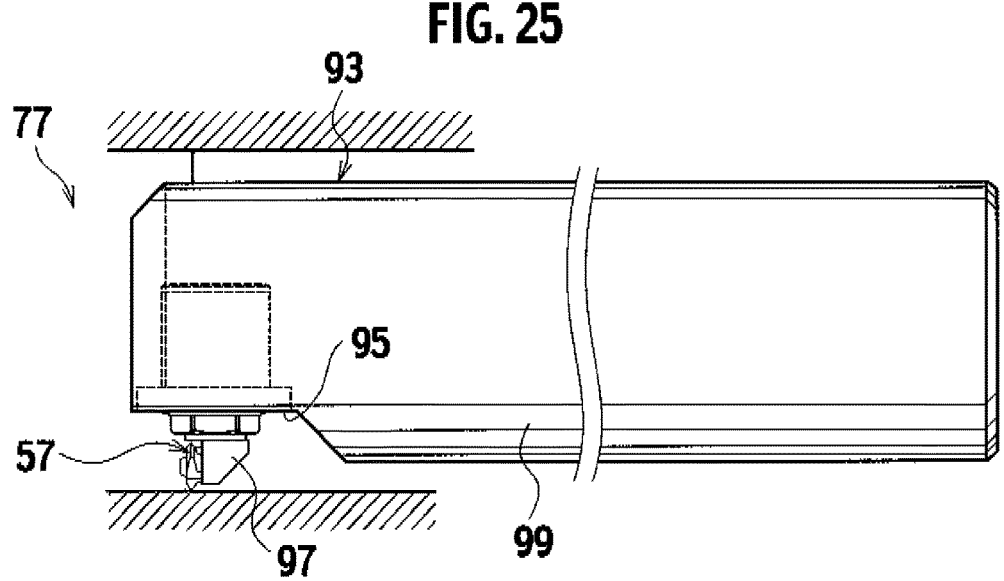
FIG. 25 is a side view illustrating a boring tool according to an embodiment of the present invention.
Figure 26:
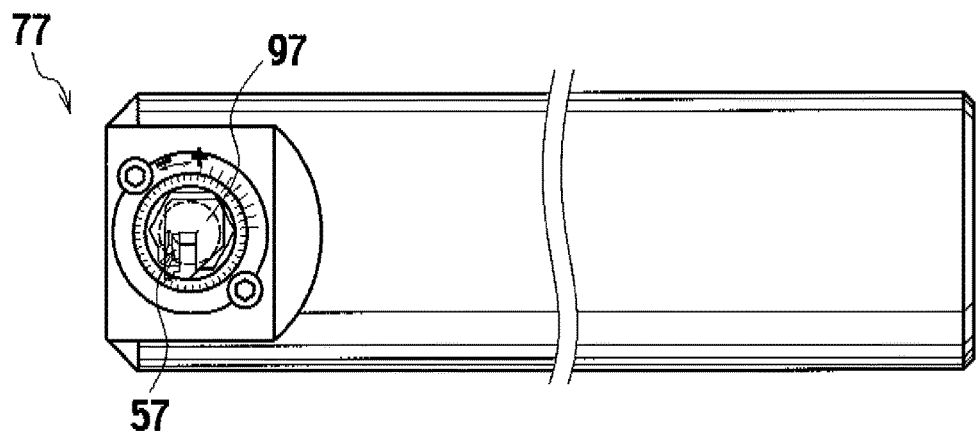
FIG. 26 is a bottom view of the boring tool of FIG. 25.
Figure 27:
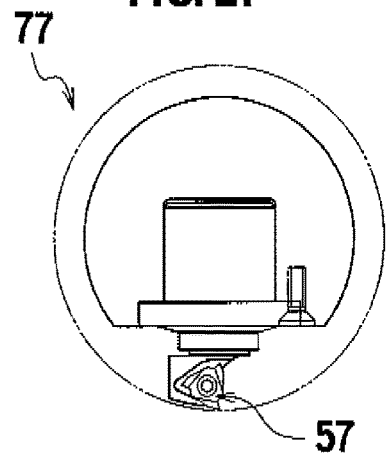
FIG. 27 is a front view of the boring tool of FIG. 25.

Furthermore, as shown in FIGS. 25 to 27, the boring tool 77 includes a tool main body 93 formed into a columnar shape. Also included is an attachment tool 97, which is attached to a tip-end portion 95 of the tool main body 93. The boring tool 77 also includes a chip 57, which is attached to the tip end of the attachment tool 97. A base-end portion 99 of the tool main body 93 is in a columnar shape, the tip-end portion 95 is formed as a flat side face along the direction of the axis 19a of the tool main body 93. The attachment tool 97 is attached to the side face.

A description will be given of advantageous effects of the cutting tool described thus far.

Firstly, as described in FIG. 5, the rake face 3 is inclined with respect to the tool-feed direction by the feed-direction rake-angle α. Consequently, the flow of the chip 23 is controlled securely, and is made to interfere with the ridge portion of the thread 27 formed on the inner circumferential wall 21 in the interference portion 25 at the rear side in the feed direction. There, the chip 23 breaks the thread 27. Formed accordingly is the broken surface 29, which in turn forms the adequately rough surface 31 on the inner circumferential wall 21.

In addition, as described in FIG. 7, the negative orthogonal rake angle β' is provided to the rake face 3 on the second cutting edge 13 side. Consequently, the cutting force in the thrust direction is increased, and the breaking of the ridge portion of the thread 27 is performed more securely.

Moreover, as described in FIGS. 11 and 12, the honing 47 is provided by chamfering the second cutting edge 45. Consequently, the cutting force in the thrust direction is increased, and the breaking of the ridge portion of the thread 27 is performed even more securely.

Furthermore, as described in FIG. 6, the positive orthogonal rake angle β is provided to the rake face 3 on the first cutting edge 11 side. Consequently, the cutting resistance can be reduced, and a flow-type chip is formed. Whereby a larger load can be applied on the thread 27 interfering with the chip. As a result, the breaking of the ridge portion of the thread 27 can be performed still even more securely.

Still furthermore, as described in FIGS. 13 to 17, the provision of the cutting edges 53 and 55 for removing incompletely broken pieces helps accomplish an efficient removal of burrs, and improves the quality of the products.

Descriptions have been given thus far of the cutting edge configuration of the cutting tool according to the present invention with examples shown in the above embodiments. The present invention is not limited to these examples. Various embodiments are possible without departing from the scope of the invention. In the above embodiments, the descriptions of the above embodiments are based on the cutting edge configuration of the cutting tool that is used for performing the lathe-turning on the workpiece with a cylindrical inner circumferential wall. The surface-to-be-cut of the workpiece, however, is not limited to a cylindrical inner circumferential wall. A cylindrical outer circumferential wall may be worked on. Furthermore, apart from the lathe-turning, the present invention can be employed in other types of cutting process, such as planomilling and shaping, by appropriately selecting the machine tool. To put it other way, the shape of the surface-to-be-cut, or that of the finished surface, is not limited to a cylindrical shape. The surface may be in a conical or a flat-sheet shape.

INDUSTRIAL APPLICABILITY

As has been described thus far, according to the cutting edge configuration of the cutting tool of the present invention, no incompletely broken piece is produced when the surface-to-be-cut is subjected to the process. As a consequence, a finished surface with adequate roughness can be obtained.

The invention claimed is:
1. A tool assembly in combination with a workpiece, the tool assembly, comprising:
   a cutting tool, and
   a workpiece support supporting the workpiece, the cutting tool arranged relative to the workpiece support and the workpiece such that the cutting tool is rotated relative to the workpiece, the cutting tool comprising:
   a first cutting edge configured to cut into a surface of the workpiece;
   a second cutting edge configured to cut into the surface of the workpiece, wherein the second cutting edge is positioned rearward of the first cutting edge both in a cutting direction and in a feeding direction of the cutting tool, the cutting direction being a direction of a primary motion of the cutting tool relative to the surface of the workpiece and perpendicular to the feeding direction, the feeding direction being parallel to an axis of the rotation of the cutting tool relative to the workpiece and being in a direction from a side of the second cutting edge to a side of the first cutting edge;
   a first flank face of the first cutting edge having a positive clearance angle, wherein the clearance angle of the first flank face is formed between the first flank face and a first plane defined by a path of the first cutting edge, the first plane being parallel to the first cutting edge and the cutting direction;
   a second flank face of the second cutting edge having a positive clearance angle, wherein the clearance angle of the second flank face is formed between the second flank face and a second plane defined by a path of the second cutting edge, the second plane being parallel to the second cutting edge and the cutting direction; and
   a rake face of the first cutting edge and of the second cutting edge, the rake face having a feed-direction rake-angle and being inclined rearward in the feeding direction of the cutting tool such that a chip departing from the surface being cut interferes with and breaks a portion of the surface being cut located rearward of the second cutting edge in the feeding direction,
   wherein an orthogonal rake angle of the second cutting edge is set at a negative angle such that the rake face in a vicinity of the second cutting edge is inclined rearward in the cutting direction by the orthogonal rake angle of the second cutting edge, wherein the orthogonal rake angle of the second cutting edge is formed by the rake face to a second line, which is within a plane orthogonal to the second cutting edge and is perpendicular to the cutting direction,
   wherein an orthogonal rake angle of the first cutting edge is set at a positive angle such that the rake face in a vicinity of the first cutting edge is inclined forward in the cutting direction by the orthogonal rake angle of the first cutting edge, wherein the orthogonal rake angle of the first cutting edge is formed by the rake face to a first line, which is within a plane orthogonal to the first cutting edge and is perpendicular to the cutting direction, and
   wherein, in a cross section of the cutting tool, parallel to the cutting direction and the feeding direction, only the second cutting edge among the first and second cutting edges has a radius of curvature.
2. The tool assembly according to claim 1, wherein the inclined rake face sets a direction of departure of the chip departing from the surface being cut to be a direction that crosses a plane including the second cutting edge and parallel to the cutting direction of the cutting tool.
3. The tool assembly according to claim 1, wherein the rake face is substantially flat between the first cutting edge and the second cutting edge.
4. A method for forming a tool assembly in combination with a workpiece, the tool assembly for roughing a surface of the workpiece, comprising:
   providing a cutting tool;
   providing the workpiece;
   providing a workpiece support configured to support the workpiece, arranging the cutting tool relative to the workpiece support and the workpiece such that the cutting tool is rotated relative to the workpiece;
   providing a first cutting edge to the cutting tool;
   providing a second cutting edge to the cutting tool in a position rearward of the first cutting edge both in a cutting direction and in a feeding direction of the cutting tool, the cutting direction being a direction of a primary motion of the cutting tool relative to the surface of the workpiece and perpendicular to the feeding direction, the feeding direction being parallel to an axis of the rotation of the cutting tool relative to the workpiece and being in a direction from a side of the second cutting edge to a side of the first cutting edge;
   providing a first flank face of the first cutting edge having a positive clearance angle, wherein the clearance angle of the first flank face is formed between the first flank face and a first plane defined by a path of the first cutting edge, the first plane being parallel to the first cutting edge and the cutting direction;
   providing a second flank face of the second cutting edge having a positive clearance angle, wherein the clearance angle of the second flank face is formed between the second flank face and a second plane defined by a path of the second cutting edge, the second plane being parallel to the second cutting edge and the cutting direction;
   providing a rake face of the first cutting edge and of the second cutting edge to the cutting tool, the rake face having a feed-direction rake-angle and being inclined rearward in the feeding direction of the cutting tool such that a chip departing from the surface being cut interferes with and breaks a portion of the surface being cut located rearward of the second cutting edge in the feeding direction;

providing an orthogonal rake angle of the second cutting edge set at a negative angle such that the rake face in a vicinity of the second cutting edge is inclined rearward in the cutting direction by the orthogonal rake angle of the second cutting edge, wherein the orthogonal rake angle of the second cutting edge is formed by the rake face to a second line, which is within a plane orthogonal to the second cutting edge and is perpendicular to the cutting direction;

providing an orthogonal rake angle of the first cutting edge set at a positive angle such that the rake face in a vicinity of the first cutting edge is inclined forward in the cutting direction by the orthogonal rake angle of the first cutting edge, wherein the orthogonal rake angle of the first cutting edge is formed by the rake face to a first line, which is within a plane orthogonal to the first cutting edge and is perpendicular to the cutting direction, and wherein, in a cross section of the cutting tool, parallel to the cutting direction and the feeding direction, only the second cutting edge among the first and second cutting edges has a radius of curvature.

5. A tool assembly in combination with a workpiece, the tool assembly, comprising:

a cutting tool, and a workpiece support supporting the workpiece, the cutting tool arranged relative to the workpiece support and the workpiece such that the cutting tool is rotated relative to the workpiece, the cutting tool comprising:

a first cutting edge configured to cut into a surface of the workpiece;

a second cutting edge configured to cut into the surface of the workpiece, wherein the second cutting edge is positioned rearward of the first cutting edge both in a cutting direction and in a feeding direction of the cutting tool, the cutting direction being a direction of a primary motion of the cutting tool relative to the surface of the workpiece and perpendicular to the feeding direction, the feeding direction being parallel to an axis of the rotation of the cutting tool relative to the workpiece and being in a direction from a side of the second cutting edge to a side of the first cutting edge;

a first flank face of the first cutting edge having a positive clearance angle, wherein the clearance angle of the first flank face is formed between the first flank face and a first plane defined by a path of the first cutting edge, the first plane being parallel to the first cutting edge and the cutting direction;

a second flank face of the second cutting edge having a positive clearance angle, wherein the clearance angle of the second flank face is formed between the second flank face and a second plane defined by a path of the second cutting edge, the second plane being parallel to the second cutting edge and the cutting direction; and a rake face of the first cutting edge and of the second cutting edge, the rake face having a feed-direction rake-angle and being inclined rearward in the feeding direction of the cutting tool such that a chip departing from the surface being cut interferes with and breaks a portion of the surface being cut located rearward of the second cutting edge in the feeding direction, wherein an orthogonal rake angle of the second cutting edge is set at a negative angle such that the rake face in a vicinity of the second cutting edge is inclined rearward in the cutting direction by the orthogonal rake angle of the second cutting edge, wherein the orthogonal rake angle of the second cutting edge is formed by the rake face to a second line, which is within a plane orthogonal to the second cutting edge and is perpendicular to the cutting direction, and wherein an orthogonal rake angle of the first cutting edge is set at a positive angle such that the rake face in a vicinity of the first cutting edge is inclined forward in the cutting direction by the orthogonal rake angle of the first cutting edge, wherein the orthogonal rake angle of the first cutting edge is formed by the rake face to a first line, which is within a plane orthogonal to the first cutting edge and is perpendicular to the cutting direction; and a third cutting edge directed rearward in the feeding direction from the second cutting edge for removing incompletely broken pieces produced on a finished surface of the workpiece, the incompletely broken pieces being different from the chip departing from the surface, wherein the third cutting edge is parallel to a plane parallel to the cutting direction and the feeding direction, and wherein, in a cross section of the cutting tool, parallel to the cutting direction and the feeding direction, only the second cutting edge among the first and second cutting edges has a radius of curvature.

6. A method for forming a tool assembly in combination with a workpiece, the tool assembly for roughing a surface of the workpiece, comprising:

providing a cutting tool;

providing the workpiece;

providing a workpiece support configured to support the workpiece, arranging the cutting tool relative to the workpiece support and the workpiece such that the cutting tool is rotated relative to the workpiece;

providing a first cutting edge to the cutting tool;

providing a second cutting edge to the cutting tool in a position rearward of the first cutting edge both in a cutting direction and in a feeding direction of the cutting tool, the cutting direction being a direction of a primary motion of the cutting tool relative to the surface of the workpiece and perpendicular to the feeding direction, the feeding direction being parallel to an axis of the rotation of the cutting tool relative to the workpiece and being in a direction from a side of the second cutting edge to a side of the first cutting edge;

providing a first flank face of the first cutting edge having a positive clearance angle, wherein the clearance angle of the first flank face is formed between the first flank face and a first plane defined by a path of the first cutting edge, the first plane being parallel to the first cutting edge and the cutting direction;

providing a second flank face of the second cutting edge having a positive clearance angle, wherein the clearance angle of the second flank face is formed between the second flank face and a second plane defined by a path of the second cutting edge, the second plane being parallel to the second cutting edge and the cutting direction;

providing a rake face of the first cutting edge and of the second cutting edge to the cutting tool, the rake face having a feed-direction rake-angle and being inclined rearward in the feeding direction of the cutting tool such that a chip departing from the surface being cut interferes with and breaks a portion of the surface being cut located rearward of the second cutting edge in the feeding direction;

providing an orthogonal rake angle of the second cutting edge set at a negative angle such that the rake face in a vicinity of the second cutting edge is inclined rearward in the cutting direction by the orthogonal rake angle of the second cutting edge, wherein the orthogonal rake angle of the second cutting edge is formed by the rake face to a second line, which is within a plane orthogonal to the second cutting edge and is perpendicular to the cutting direction;

providing an orthogonal rake angle of the first cutting edge set at a positive angle such that the rake face in a vicinity of the first cutting edge is inclined forward in the cutting direction by the orthogonal rake angle of the first cutting edge, wherein the orthogonal rake angle of the first cutting edge is formed by the rake face to a first line, which is within a plane orthogonal to the first cutting edge and is perpendicular to the cutting direction; and providing a third cutting edge directed rearward in the feeding direction from the second cutting edge for removing incompletely broken pieces produced on a finished surface of the workpiece, the incompletely broken pieces being different from the chip departing from the surface, wherein the third cutting edge is parallel to a plane parallel to the cutting direction and the feeding direction, and wherein, in a cross section of the cutting tool, parallel to the cutting direction and the feeding direction, only the second cutting edge among the first and second cutting edges has a radius of curvature.

\* \* \* \* \*